THERMOELECTRIC DEVICE WITH SOLDER-FREE PRESSURE CONTACTS

Filed Nov. 27, 1962

United States Patent Office 3,377,206
Patented Apr. 9, 1968

3,377,206
THERMOELECTRIC DEVICE WITH SOLDER-FREE PRESSURE CONTACTS

Walter Hänlein, Erlangen, and Reimer Emeis, Ebermannstadt, Germany, assignors to Siemens Aktiengesellschaft, Munich, Germany, a corporation of Germany Filed Nov. 27, 1962, Ser. No. 240,478
Claims priority, application Germany, Nov. 28, 1961, S 76,870
2 Claims. (Cl. 136—212)

Our invention relates to thermoelectric devices for cooling, heating or current-generating purposes in which the legs of thermocouples are arranged in a serial or mosaic pattern but in mutually spaced relation and are firmly joined together to form a single battery or block whose respective top and bottom surfaces are substantially coincident with respective two end faces of each leg.

In such devices, each two adjacent legs of thermoelectrically different materials, such as p-type and n-type semiconductor substances respectively, are electrically and thermally connected with each other at the respective top surfaces or bottom surfaces by a bridge piece of metal. In many known devices of this type, the bridge pieces are rigidly joined with the thermocouple legs by soft soldering. The soldered bonds thus produced, however, are often the source of trouble. For example, when the device is in operation, the fact that the semiconductor materials and the materials of the connecting bridge pieces have different temperature coefficients of expansion, may result in thermal tension that may cause fissures in the solder mass or in the semiconductor material thus impairing the proper operation of the device.

It is an object of our invention to avoid such deficiencies and also to eliminate other difficulties and trouble that may result from the necessity of applying soldering heat to the materials of the thermocouple legs.

To this end, and in accordance with a feature of our invention, we design a thermoelectric device of the above-mentioned type in such a manner that the interconnection between the thermocouple legs is effected by solder-free pressure contacts. More specifically, we place upon each two thermocouple legs to be interconnected, or at least upon respective surface portions of these legs, a bridge piece of metal and we further provide in back of the bridge piece a pressure spring with suitable abutment means so that the spring force causes the bridge piece to be pressed against the legs, thus establishing the necessary thermal and electrical interconnection exclusively by spring force and without the use of solder or other fusion bonding. As a result, the occurrence of stresses due to differences in temperature coefficients of expansion are avoided because the bridge pieces remain capable of lateral displacement relative to the thermocouple legs in the event of differences in thermal expansion.

Preferably, and in accordance with another feature of our invention, we interpose between the bridge piece and the respective thermocouple legs a conducting foil. Particularly suitable is a foil of silver or other noble metal. The spring for producing the contact force is preferably a leaf spring and coated with an electrically non-conducting layer. It is further of advantage that the top and bottom faces of the thermocouple legs as well as the corresponding contact surfaces of the bridge pieces be finely ground or lapped.

According to another feature of our invention, a number of thermocouple legs and solder-free bridge pieces, as described above, are mounted in an insulating plate or partitioning wall of insulating material in the desired spaced relation from each other so that the wall remains liquid-tightly or gas-tightly sealed. This partition, containing the legs, can then be built into a liquid or gas-sealed housing in such a manner that the partition with the thermocouple legs divides the interior of the housing into two separate chambers, with all hot junctions of the thermocouples located in one chamber and the cold junctions in the other. The housing is preferably provided with conduit means for passing a liquid heat-exchanging medium through the chambers in order to supply heat to, or dissipate heat from, the connecting bridge pieces located in the respective chambers. According to a modification, the housing may also be filled with protective gas. The gas may then pass under high pressure through the housing to serve as heat transfer agent. However, the housing filled with the protective gas, may be provided with cooling vanes or other heat-dissipating structures on its external side.

The above-mentioned and more specific objects, advantages and features of our invention, said features being set forth with particularity in the claims annexed hereto, will be apparent from and will be described in, the following with reference to embodiments of solder-free thermoelectric devices according to the invention illustrated by way of example on the accompanying drawing, in which:

Figure 1:
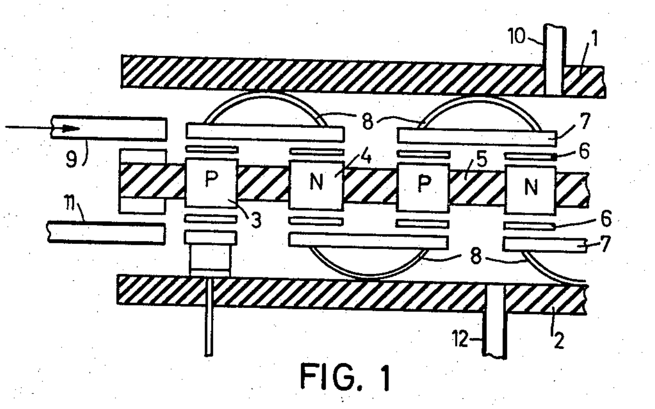
FIG. 1 shows schematically and in somewhat exploded fashion a device comprising a housing traversed by heat-exchanging liquid.
Figure 4:
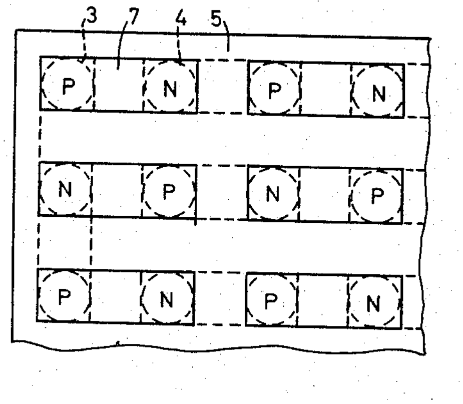
FIG. 4 is a top view on the leg-carrying partition that forms part of the devices shown in FIG. 1.

The device illustrated in FIG. 1 comprises a housing whose cover and bottom plates are denoted by 1 and 2. These plates consist of metal but may also consist of insulating or any other material. A number of thermocouple legs P and N, also denoted by 3 and 4 respectively, are tightly inserted into an insulating plate 5 in a pattern according to FIG. 4. Each two legs P and N consist of respectively different thermoelectric materials. For example, all legs P may consist of the same semiconductor material doped for p-type conductance, and all legs N may consist of the same or a similar semiconductor material doped for n-type conductance.

While the particular size and material of the legs is of no concern to our invention, they may consist, for example, of cubic blocks of 5 x 5 x 5 mm. size. The P legs of small p-type conductance may consist of 30 mol percent $Bi_2Te_3$+70 mol percent $Sb_2Te_3$+added dopant composed of 3% by weight of Te and 0.075% by weight of Pb, the latter percentages relating to the weight of the total composition. The legs N of n-type conductance may be composed of 80 mol percent $Bi_2Te_3$+20 mol percent $Bi_2Se_3$ with an added dopant consisting of 0.075% CuBr by weight. The just-mentioned composition is in accordance with one of those disclosed in the copending application Ser. No. 223,973, filed Sept. 17, 1962, by H. Schreiner and F. Wendler and assigned to the assignee of the present invention, and the semiconductor compositions may be produced in the manner also described in the same copending application.

The top and bottom surfaces of the legs P and N are lapped so as to be accurately planar. Placed upon these surfaces are pieces of silver foil 6 cut to accurate size. Placed on top of two mutually adjacent legs P and N that are to be interconnected is a bridge piece 7 of metal, preferably copper. The contact surfaces of the bridge pieces are likewise lapped. Placed behind each bridge piece 7 is a leaf spring 8 which in the illustrated, relaxed condition is of arcuate shape. Each leaf spring is coated with an electrically insulating layer. The curved back of each leaf spring abuts against the respective housing walls 1 and 2. When the assembling work is completed by forcing the two housing walls 1 and 2 against each other, thus flattening the leaf springs 8, the spring force presses the bridge pieces 7 against the foil 6 and against the top and bottom faces of the thermocouple legs. This establishes a reliable and permanent series-connection of all thermocouple legs, all hot junctions and connecting bridge pieces being located on one side of the insulating partition 5 and all cold junctions and appertaining bridge pieces on the other side.

As schematically indicated, the two chambers within the housing on the respective sides of the partition 5 communicate with pipes 9, 10 and 11, 12. The pipes 9 and 10 together with the intermediate chamber form part of a circulatory path for heat transfer liquid, and the pipes 11 and 12 with the intermediate other chamber form a second path. One of these paths is available to supply water for cooling the hot junctions, and the other path may then be used for passing brine through the other chamber in the event the device is used for cooling purposes. It will be understood that after the leaf springs 8 are compressed in the above-described manner, the housing is to be completed by lateral wall portions which are not illustrated. These lateral wall portions can be shoved over the top and bottom walls or may otherwise be fastened and sealed thereto. For example, when forming the housing of sheet metal, the lateral walls may be joined with the top and bottom walls by folding seams.

Figure 2:
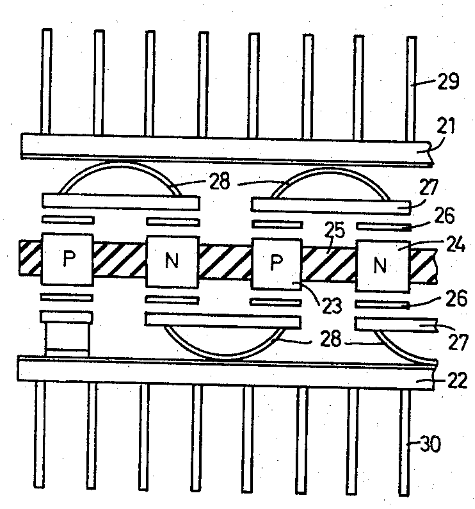
FIG. 2 shows another embodiment of a thermoelectric device with a housing provided with external heat transfer vanes, prior to completion of the assembly.

FIG. 2 shows a device equipped with a gas-tight housing in a stage of assembling work prior to pressing the top and bottom walls 21, 22 against each other. The assembly is essentially designed and composed in the same manner as described above with reference to FIG. 1. The thermocouple legs 23 and 24 are inserted into an insulating partition 25. The silver foils and connecting bridge pieces are denoted by 26 and 27 respectively and are forced against the lapped end faces of the legs by means of leaf springs 28. The two half-portions of the housing carry a number of heat transfer vanes or ribs 29 and 30. Pipes for the supply of protective gas such as nitrogen, or for passing protective gas through the housing, as well as the lateral wall portions are not shown.

Figure 3:
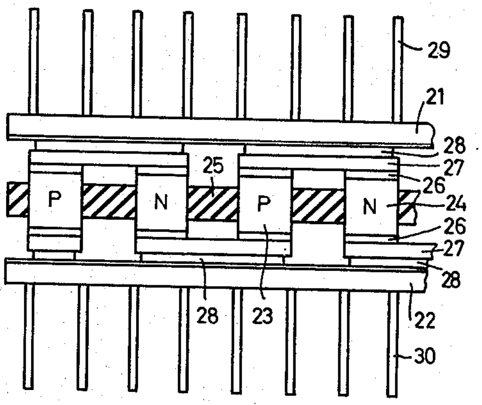
FIG. 3 shows the same device as in FIG. 2 but in a subsequent stage of assembly, although still without the lateral portions of the housing wall.

FIG. 3 shows the middle portion of the same housing after completion. The leaf springs 28 are tightly pressed against the bridge pieces 27 and thereby establish the above-mentioned good and permanent contact.

It will be recognized that, although a high contact pressure is exerted against the end faces of the thermocouple legs, the connecting bridge pieces are nevertheless capable of slight lateral displacements relative to the legs in the event of any discrepant thermal elongation or contraction. Consequently the invention not only does away with difficulties inherent in the necessity of applying solder and high temperatures to many localities of the device but also eliminates all possibilities of trouble due to differences in thermal coefficients of expansion.

In FIGS. 2 and 3 the plates 21 and 22 are coated with a suitable insulating varnish so that the housing walls cannot short-circuit the thermocouple voltages.

To those skilled in the art, it will be obvious upon a study of this disclosure, that with respect to details of design, arrangement and materials, our invention is amenable to a variety of modifications and hence can be given embodiments other than particularly illustrated and described herein, without departing from the essential features of the invention and within the scope of the claims annexed hereto.

We claim:

1. A thermoelectric device comprising pairs of thermocouple legs, said legs being spaced from each other and forming jointly a serial arrangement, respective bridge pieces of metal placed upon each two adjacent ones of said legs and forming an electrically and thermally conducting interconnection thereof, said thermocouple legs being built into an insulating partition and tightly sealed in the partition, a conducting foil interposed between said legs and said bridge pieces, a rigid mounting structure, and spring means between said structure and said bridge pieces for forcing said bridge pieces and said foil under pressure against said legs, whereby said legs are conductively interconnected only by solder-free pressure contact engagement, said mounting structure forming a sealed housing, said partition forming part of said sealed housing and dividing it into two chambers, at least one of said chambers forming part of a circulatory system for fluid heat exchange medium.

2. A thermoelectric device comprising pairs of thermocouple legs, said legs being spaced from each other and forming jointly a serial arrangement, respective bridge pieces of metal placed upon each two adjacent ones of said legs and forming an electrically and thermally conducting interconnection thereof, said thermocouple legs being built into an insulating partition and tightly sealed in the partition, a rigid mounting structure, and spring means between said structure and said bridge pieces for forcing said bridge pieces and said foil under pressure against said legs, whereby said legs are conductively interconnected only by solder-free pressure contact engagement, said mounting structure forming a sealed housing, said housing being filled with protective gas.

References Cited

UNITED STATES PATENTS

| | | | |
|---|---|---|---|
| 1,848,655 | 3/1932 | Petrick | 136—212 |
| 3,082,275 | 3/1963 | Talaat | 136—208 |
| 3,110,628 | 11/1963 | Ramey et al. | 136—204 X |
| 3,111,432 | 11/1963 | Sickert et al. | 136—203 X |
| 3,129,116 | 4/1964 | Corry | 136—204 X |
| 2,232,961 | 2/1941 | Milnes | 136—211 |
| 2,952,725 | 9/1960 | Evans et al. | 136—221 X |
| 2,972,653 | 2/1961 | Fritts et al. | 136—228 |

ALLEN B. CURTIS, *Primary Examiner.*

J. H. MACK, WINSTON A. DOUGLAS, *Examiners.*

D. L. WALTON, *Assistant Examiner.*